(12) United States Patent
Altmikus et al.

(10) Patent No.: US 8,215,908 B2
(45) Date of Patent: Jul. 10, 2012

(54) PROFILE DEFORMATION USING THE EXAMPLE OF A ROTOR BLADE

(75) Inventors: Andree Altmikus, Hoehenkrichen-Siegertsbrunn (DE); Rupert Pfaller, Riemerling (DE); Bernhard Enenkl, Bockhorn (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 1153 days.

(21) Appl. No.: 12/048,480

(22) Filed: Mar. 14, 2008

(65) Prior Publication Data

US 2008/0226448 A1    Sep. 18, 2008

(30) Foreign Application Priority Data

Mar. 16, 2007 (DE) .......................... 10 2007 013 289

(51) Int. Cl.
*F01D 5/00* (2006.01)
*F03B 3/12* (2006.01)
*B63H 1/26* (2006.01)

(52) U.S. Cl. .......................... 416/23; 416/240

(58) Field of Classification Search ............... 416/23, 416/24, 240, 132 R, 132 A, 132 B, 230, 226, 416/DIG. 5
See application file for complete search history.

(56) References Cited

U.S. PATENT DOCUMENTS

| | | | | |
|---|---|---|---|---|
| 1,225,711 A | * | 5/1917 | Holle | 244/219 |
| 3,179,357 A | * | 4/1965 | Lyon | 244/219 |
| 3,716,209 A | * | 2/1973 | Pierce | 244/123.1 |
| 4,131,253 A | * | 12/1978 | Zapel | 244/219 |
| 6,010,098 A | * | 1/2000 | Campanile et al. | 244/219 |
| 6,070,834 A | | 6/2000 | Janker et al. | |
| 6,152,405 A | | 11/2000 | Muller et al. | |
| 6,173,925 B1 | | 1/2001 | Mueller et al. | |
| 6,644,919 B2 | * | 11/2003 | Bauer et al. | 416/23 |
| 6,648,599 B2 | | 11/2003 | Preissler et al. | |
| 2003/0102411 A1 | * | 6/2003 | Kota | 244/219 |
| 2006/0186269 A1 | * | 8/2006 | Kota et al. | 244/123.1 |
| 2009/0269198 A1 | * | 10/2009 | Grohmann et al. | 416/23 |
| 2009/0302168 A1 | * | 12/2009 | Hetrick et al. | 244/214 |

FOREIGN PATENT DOCUMENTS

| | | |
|---|---|---|
| DE | 271111 | 3/1914 |
| DE | 19643222 | 4/1998 |
| DE | 19653851 | 6/1998 |
| DE | 19804308 | 4/1999 |
| DE | 19825224 | 12/1999 |
| DE | 10116479 | 10/2002 |
| DE | 10334267 | 2/2005 |

* cited by examiner

*Primary Examiner* — Dwayne J White
*Assistant Examiner* — Su Htay
(74) *Attorney, Agent, or Firm* — Brooks Kushman P.C.

(57) ABSTRACT

An aerodynamic profile includes a main profile body defining a profile depth direction and being shear-flexible in the profile depth direction, a tension-stiff and compression-stiff upper covering skin, a tension-stiff and compression-stiff lower covering skin, wherein the upper and lower covering skins envelope the main profile body, a bearingless and hingeless rear profile deformation region disposed at a rear edge region, and at least one actuator disposed in the main profile body. The at least one actuator is configured to initiate a flexural motion of the main profile body resulting in a curvature of the upper and lower covering skins and to deform the rear profile deformation region and so as to yield a flap deflection directed opposite to a direction of the flexural motion.

24 Claims, 6 Drawing Sheets

PROFILE DEFORMATION USING THE EXAMPLE OF A ROTOR BLADE

Priority is claimed to German Patent Application No. DE 10 2007 013 289.3, filed on Mar. 16, 2007, the entire disclosure of which is incorporated by reference herein.

The present invention relates to an aerodynamic profile having a rear profile deformation region embodied in bearingless and hingeless fashion, in particular for a rotorcraft.

BACKGROUND

It is known that in a rotorcraft, the incident flow conditions onto a rotor are constantly changing even in a steady-state flight regime. These changes result from a superposition of the forward speed of the rotorcraft and the rotation speed of the rotor.

This superposition results substantially in two extreme incident-flow situations, specifically at the advancing blade and the retreating blade. At the advancing blade, the rotational component is superimposed positively on the translational component, and results in an incident flow with a highly transonic expression at the blade tip. In this case a maximally thin profile having a small curvature is desirable in order to prevent severe supersonic shocks. At the retreating blade, the translational component resulting from the forward flight speed is subtracted from the rotational component. This leads to a sharp reduction in the local incident flow speed, to the point that in the inner blade region, the flow is incident on the profile from behind. In combination with the high blade angle present there, the low incident flow speed results in considerable flow detachment, which negatively affects the control rod loads of the rotor. In this region, a thicker profile or a profile having a large curvature in the nose region would be advantageous.

A profile whose geometry is modifiable is proposed, and which takes into account these extreme flow regions and adjusts itself adaptively to the particular conditions that exist.

The great variation in aerodynamic conditions at the rotor in the course of a revolution results overall in vibrations of the rotor blades at a multiple of the rotation frequency.

A further disadvantageous aerodynamic effect exists during approach by the aircraft at certain sink angles. An interaction can occur in this context between the blade eddy and the blades, leading to a pulsing noise phenomenon. This phenomenon can be mitigated by deforming the rotor downwash at a suitable azimuthal position, or modifying the spatial location of the blade, in such a way that the above-described interaction of the eddy and blade does not occur. This relative change in the spacing of the blade and wake is achieved by a brief modification in lift.

In principle, two possibilities exist for modifying blade lift:
1. Directly: As in the case of a fixed-wing aircraft's wing, lift is modified by a downward flap deflection (downward flap deflection=>increased lift); or
2. Indirectly: The flap deflection generates, by way of a modified moment coefficient, a torsional moment that adjusts the angle of attack of the torsionally flexible blade by means of the induced torsional deformation (upward flap deflection=>torsional deformation=>change in angle of attack=>increased lift). This effect is also referred to in the literature as a "servo effect."

The second possibility is used more often at present, since it appears more effective in the context of available positioning drive performance levels.

A rotor blade utilizing the servo effect and having a movably mounted flap is known from DE 101 16 479 A1. The flap is movably attached to the rotor blade with the aid of rolling bearings. Control is applied to the flap via a piezoactuator that is arranged at a spacing in a front (as viewed in the profile depth direction) region of the rotor blade. The piezoactuator generates positioning forces, and transfers them via tension elements to the rotor blade flap.

In practical use, rotor blades having discrete flap bearings are subject to elevated wear because of their high frequency and as a result of dust, dirt, and water in the environment. A shortened service life and increased maintenance requirement are the results.

DE 103 34 267 A1 therefore proposes a rotor blade having a rotor blade flap embodied in bearingless and hingeless fashion. In the disclosed rotor blade, piezoelectric actuators are mounted into the rigid covering skins of the blade profile or directly below the inherently rigid covering skins, or on the rigid covering skins, so that one of the two piezoelectric actuators on the upper-side covering skin or lower-side covering skin of the blade profile can selectably be actuated, and thus cause a displacement of the respective covering skin relative to the other covering skin; this shortens or lengthens the upper covering skin relative to the lower covering skin. The relative shortening of one covering skin with respect to the other causes the rigid rotor blade flap attached to the covering skins to be deflected, and to be moved upward or downward.

The known rotor blades of the kind previously recited have the disadvantage that an upwardly deflected flap causes the generation of lift, which results in a rise in drag as compared with a neutral or downwardly deflected profile.

SUMMARY OF THE INVENTION

An aspect of the present invention is to make available an aerodynamic profile, in particular for a rotorcraft, having a hingeless and bearingless flap that is mechanically and kinematically simple, possesses favorable aerodynamic properties, and enables a continuously transitioning deformation in the profile chord and spanwise directions.

According to the present invention, the rotor blade encompasses an aerodynamically effective rotor blade profile having a main profile body embodied in shear-flexible fashion in the profile depth direction, an upper and a lower covering skin enveloping the main profile body and embodied in tension-stiff fashion, a bearingless and hingeless rear profile deformation region embodied in the rear profile edge region of the rotor blade profile, and at least one actuator arranged in the main profile body. A flexural motion of the main profile body can be initiated via the actuator, by means of which motion the rear profile deformation region can be deformed by way of a curvature, resulting from the flexural motion of the main profile body, of the upper and lower covering skins to yield a rotor blade flap deflection directed in an opposite direction with respect to the flexural motion. The flexion can also just as easily be initiated in the rear profile deformation region, in which context the main profile body deforms. Because of the shear-flexible embodiment of the main profile body and the tension-stiff embodiment of the upper and lower covering skins, the result of the initiated flexural motion is a pure flexural deformation, i.e. only a flexural elongation of the upper and the lower covering skin occurs. The flexural deformation results in a curvature of the upper and lower covering skin, i.e. a first curvature in the vicinity of the region of the main profile body deflected by the flexural motion, and a second curvature in the region of the rear profile deformation region. This second curvature, embodied in the form of a counter-deflection, causes the deflection of the rear profile deformation region. For example, a downward flexural deformation of the main profile body causes an upward deflection of the rear profile deformation region, and an upward flexural deformation of the main profile body causes a downward deflection of the rear profile deformation region. Advantageously, an aerodynamically favorable profile is made available, since because of the S-shaped deformation of the profile that is produced, the profile has lower drag as compared with flap profiles having a discrete flap and an inevitable discontinuity in the profile contour when the flap is deflected.

Further advantages that may be added are that the rotor blade profile according to the present invention has a simple, homogeneous construction because of the simple part geometry and the small number of individual parts. In addition, the overall deformation kinematics is considerably simplified as compared with that of a discrete flap, since parts subject to wear are no longer present.

According to an embodiment of the invention, the main profile body is embodied substantially as a hollow body, i.e. the main profile body comprises, in its interior, a hollow chamber extending in the spanwise and the profile-depth direction. This ensures the requisite shear flexibility of the main profile body. An embodiment with shear-flexible foamed material is likewise possible.

Multiple struts that are fixedly joined to the upper and the lower covering skin are preferably introduced into the deformable profile region. Introduction of the struts advantageously makes it possible to influence or adjust the profile contour that results after a flexural motion of the main profile body.

In order to ensure sufficient shear flexibility in the profile depth direction of the main profile body, the struts are preferably joined in flexurally soft or quasi-articulated fashion to the upper and the lower covering skin.

It is also conceivable for the struts to be embodied in shear-flexible fashion, or for the entire deformable cross section to be filled with shear-flexible foamed material.

According to a particularly advantageous embodiment of the invention, the rear profile deformation region and a central profile region, adjacent to the rear profile deformation region and arranged in front of the rear profile deformation region in the profile depth direction (T), of the main profile body are embodied in shear-flexible fashion. The remaining front profile region of the main profile region can be embodied as a rigid profile region.

The actuator or actuators is/are then preferably in working engagement only with the central profile region. This makes possible, in simple fashion, an arrangement of the actuators spaced apart (as viewed in the profile depth direction (T)) from the rear profile deformation direction. This proves advantageous especially with regard to weight distribution and dynamic properties.

According to an embodiment of the invention, the actuator is embodied as a flexural actuator.

Preferably the flexural actuator is secured onto the upper and/or lower covering skin. The flexural actuator(s) can be secured onto the upper and/or lower covering skin by means of a materially attached and/or positive and/or frictionally engaged connection.

According to an embodiment of the invention, the flexural actuator can also be located in the center, and can transfer force through struts onto the covering skins.

According to another embodiment of the invention, the actuator or actuators is/are embodied as discrete actuators that, preferably by shortening of the diagonals between two struts, bring about a deformation.

According to an embodiment of the invention, the actuator is embodied as a flexural actuator on at least one of the struts. The profile is deformed by the flexural deformation of the strut.

According to another embodiment of the invention, the actuator or actuators is/are embodied as discrete actuators that, by shortening an articulation point on the upper and/or lower side in the rear profile deformation region, bring about a deformation.

According to another embodiment of the invention, the actuator or actuators is/are embodied as discrete actuators that, by shortening an articulation point on a half-strut, generate on the blade skin a moment that brings about a deformation of the central or rear profile region.

According to another embodiment of the invention, the actuator or actuators is/are embodied as discrete actuators that, by torsion and by transfer of the torsional deformation to a strut, deform the lower and the upper blade skin and thus the central or rear profile region.

According to another embodiment of the invention, the actuator or actuators is/are embodied as discrete actuators that, by transferring force to a strut via a lever, bring about a deformation of the central profile region.

According to another embodiment of the invention, the actuator or actuators is/are embodied as discrete actuators that, by transferring force to a strut via a lever, bring about a deformation of the central and rear profile regions simultaneously.

The upper and lower deck skins are preferably configured from a fiber composite material. Because, in contrast to other concepts, no region of the upper and lower covering skins needs to be shortened, but rather the upper and lower profile contours are merely deformed by way of a flexion of the upper and lower covering skins, a configuration of the upper and lower covering skins from an ordinary fiber composite material is possible in this case. In other words, the usual external skin construction can be retained.

According to an embodiment of the invention, the upper and/or lower covering skin has a thickness that varies as viewed along the profile depth direction (T). The effect of this is that the flexion line of the profile is adjustable, and the depth of the flap region is scalable.

According to another embodiment of the invention, the upper and/or lower covering skin has a ply structure that varies as viewed in the profile depth direction (T). The possibilities for variation in the ply structure encompass different numbers of plies, ply lengths in the profile depth direction, fiber orientation, and different fiber composite materials. This also makes available a capability for scaling the flexion line or lines.

Also conceivable is a combination of the two possibilities, i.e. the upper and/or lower covering skin has a thickness and a ply structure that vary as viewed along the profile depth (T).

The fundamental idea of the invention is not limited to what has been presented above, but can also be used, for example, to realize the principle of the Flettner flap, i.e. with little energy it is possible to deform a small trailing-edge region that then, by way of aerodynamic forces, deforms a deeper profile region having a greater aerodynamic effect.

The principal effects described above can be implemented in this fashion in an energetically favorable fashion with a suitable skin construction (i.e. conformation of the flexion line). If the flexion line is configured in such a way that the central profile region experiences a large convexity, a large change in lift occurs in accordance with the direct exertion of action on the rotor blade, while the profile's moment behavior is neutral. If the flexion line is configured in such a way that the rear profile deformation region deflects with high amplitude and the central profile region is only relatively slightly deformed in the opposite direction, the aerodynamic change in moment (with a small change in lift) comes to the fore, corresponding to the above-described servo effect.

Further advantages, features, and possible applications of the present invention are evident from the description below in combination with the exemplifying embodiment depicted in the drawings.

BRIEF DESCRIPTION OF THE DRAWINGS

The invention will be further described below with reference to the exemplifying embodiment depicted in the drawings, in which.

The terms used in the list of reference characters provided below, and associated reference characters, are used in the description, the claims, the abstract, and the drawings.

DETAILED DESCRIPTION

In order to avoid repetition, identical constituents and components are also identified with identical reference characters in the description that follows and in the Figures, provided no further differentiation is necessary or advisable.

Figure 1:
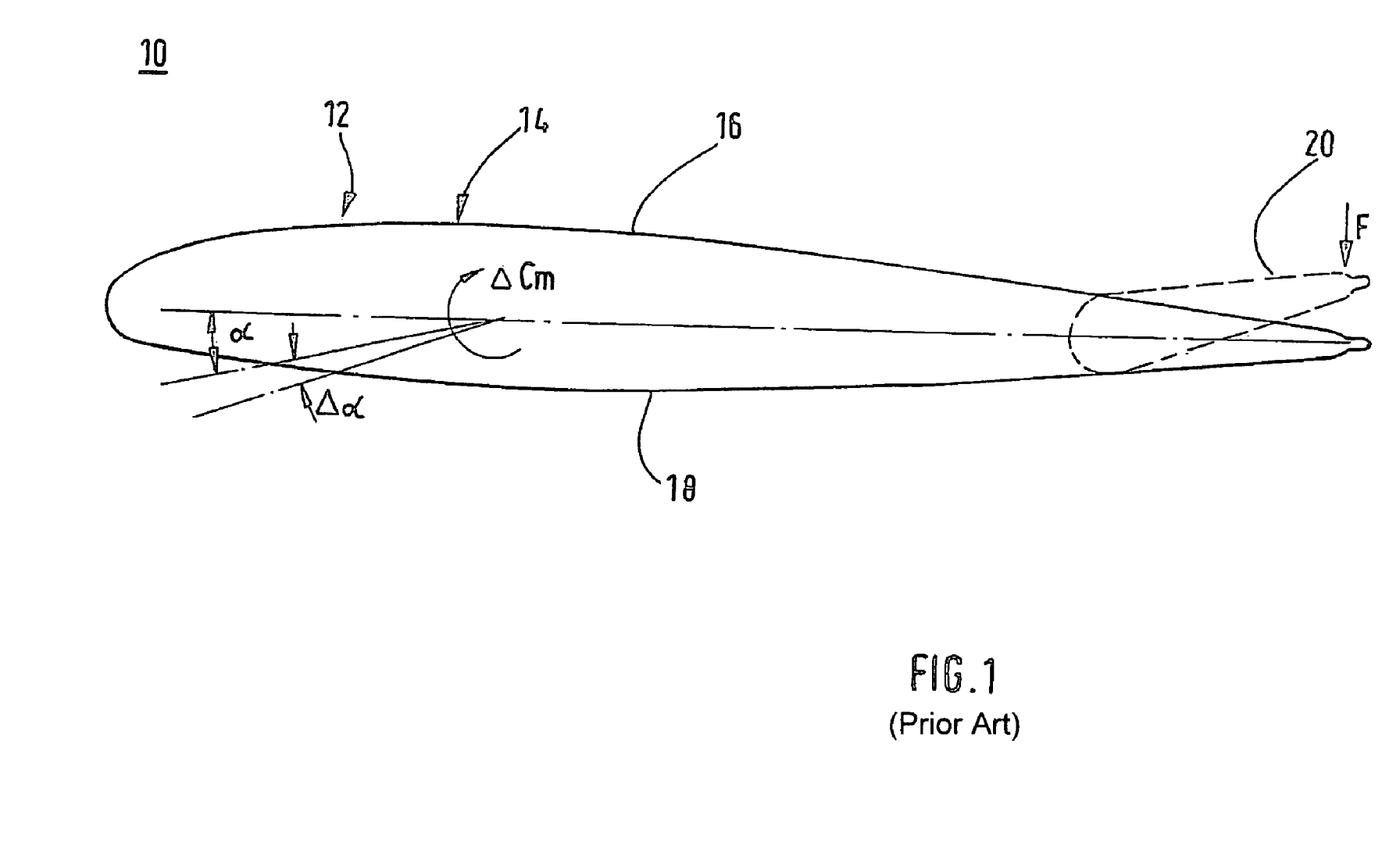
FIG. 1 is a simplified depiction of a rotor blade profile having a flap, according to the existing art.

The profile according to the existing art (cf. DE 101 16 479 A1) that is depicted in simplified and more or less schematic fashion in FIG. 1 and is labeled in its entirety with the reference number 10 encompasses substantially an aerodynamically effective rotor blade profile 12 having a main profile body 14 embodied in torsionally flexible fashion, an upper and a lower covering skin 16, 18 enveloping main profile body 14, and a flap 20 mounted movably on main profile body 14. Lift is generated in the present case by an upward deflection of flap 20. The upward deflection of flap 20, and the force F resulting therefrom and acting on flap 20, bring about a change in moment coefficient $C_m$. This results, because of the torsionally soft configuration of main profile body 14, in a torsional deformation of profile 10, which effects a change in angle of attack $\alpha$ and the desired change in lift.

The above concept proves to be disadvantageous, since any deflection of flap 20 with respect to a neutral flap position leads to an increase in drag.

Figure 2:
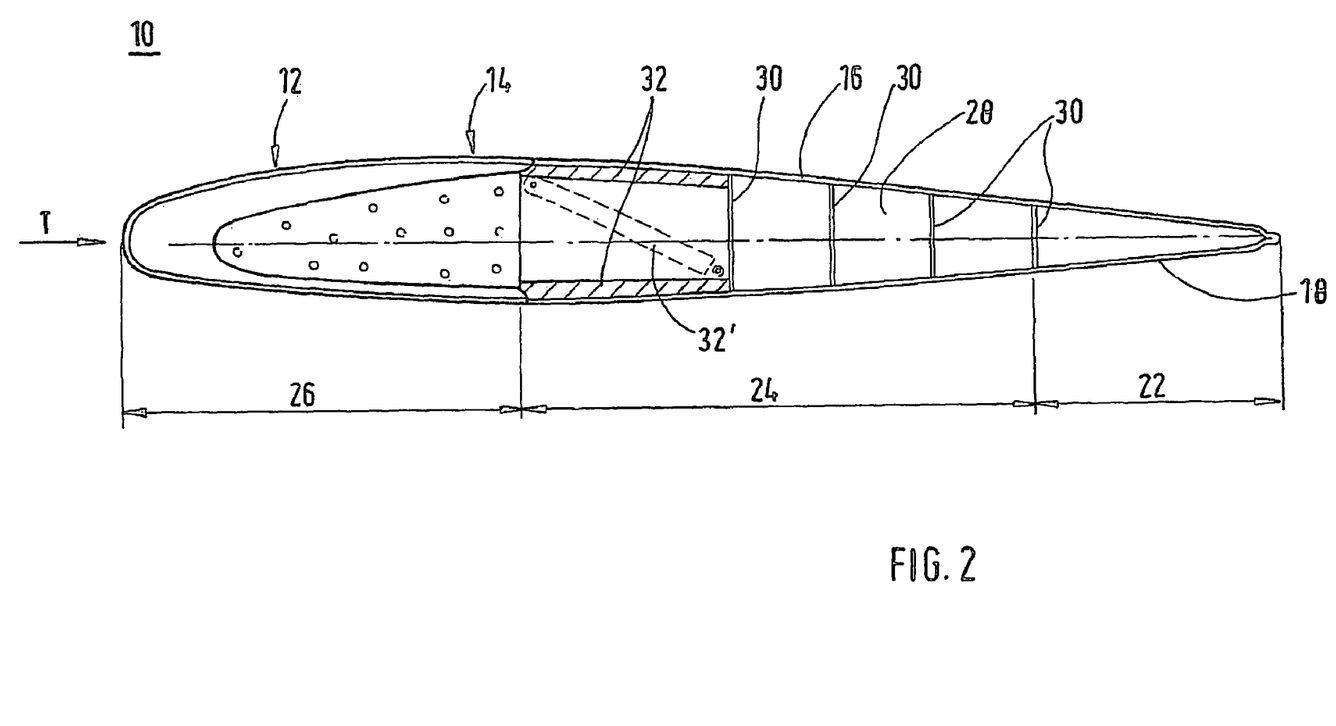
FIG. 2 is a simplified sectioned depiction of a rotor blade profile according to the present invention.

To eliminate this disadvantage, profile 10 according to the present invention depicted in FIG. 2 encompasses an aerodynamically effective rotor blade profile 12 having a main profile body 14 embodied in shear-soft fashion in the blade depth direction, an upper and a lower covering skin 16, 18 enveloping main profile body 14 and embodied in tension-stiff and compression-stiff fashion, and a bearingless and hingeless rear profile deformation region 22 embodied in the trailing-edge region of the profile.

In the present case, main profile body 14 comprises three subregions, namely rear profile deformation region 22, a central profile region 24 adjacent to rear profile deformation region 22 and arranged in front of rear profile deformation region 22 as viewed in profile depth direction T, and a front profile region 26 adjacent to said central region and encompassing the nose region.

In the exemplifying embodiment depicted, rear profile deformation region 22 and central profile region 24 adjacent thereto are embodied in shear-soft fashion in the blade depth direction, while front profile region 26 is embodied rigidly.

Main profile body 14 comprises in its interior a hollow chamber 28 extending in the spanwise direction and in profile depth direction T, into which chamber multiple vertically arranged struts 30 are introduced. In order to ensure sufficient shear softness of profile 12, struts 30 are configured from a flexurally soft material and are joined by means of an elastic connection to upper and lower covering skins 16, 18.

Multiple actuators 32, 32' are also arranged in hollow chamber 28. Merely by way of example, in the present case the actuators depicted are on the one hand a pair of piezoelectric flexural actuators 32 secured onto upper and lower covering skin 16, 18, and on the other hand a discrete actuator 32' (dashed lines).

Actuators 32 and 32' are, in the present case, in working engagement only with central profile region 24.

A flexural motion of the elastically embodied central profile region 24, and thus an deflection of rear profile deformation region 22, can be initiated by way of actuators 32 and 32'.

Merely for the sake of completeness, it is noted that the actuator deformation can also be introduced into the rear profile deformation region.

Figure 3:
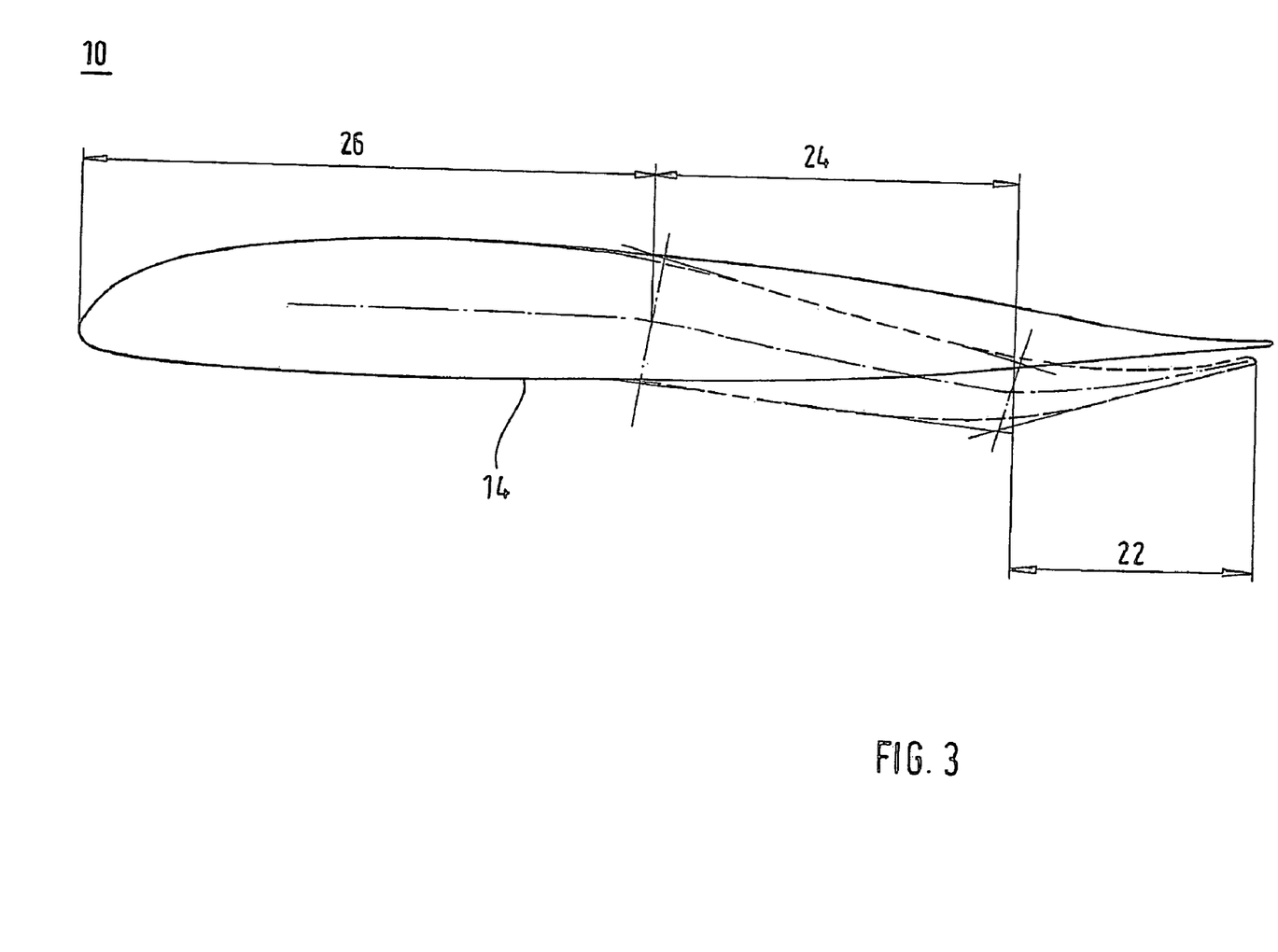
FIG. 3 shows the profile of FIG. 2 with the flap region deflected upward.

The situation with an upwardly deflected rear profile deformation region is depicted in FIG. 3.

A downward flexural motion of central flap region 24 brings about a first curvature of upper and lower covering skin 16, 18. Because of the tension-stiff embodiment of upper and lower covering skin 16, 18, the result thereof is a second, oppositely directed curvature that deforms rear profile deformation region 22 upward. The profile chord of the deformed profile 12 thus exhibits a characteristic S-shaped deflection contour.

In the present case, upper and lower covering skins 16, 18 are configured from a fiber composite material. For corresponding scaling of rear profile deformation region 22, upper and lower covering skins 16, 18 can each have a thickness and a ply structure that vary as viewed along profile depth direction T.

Figure 4:
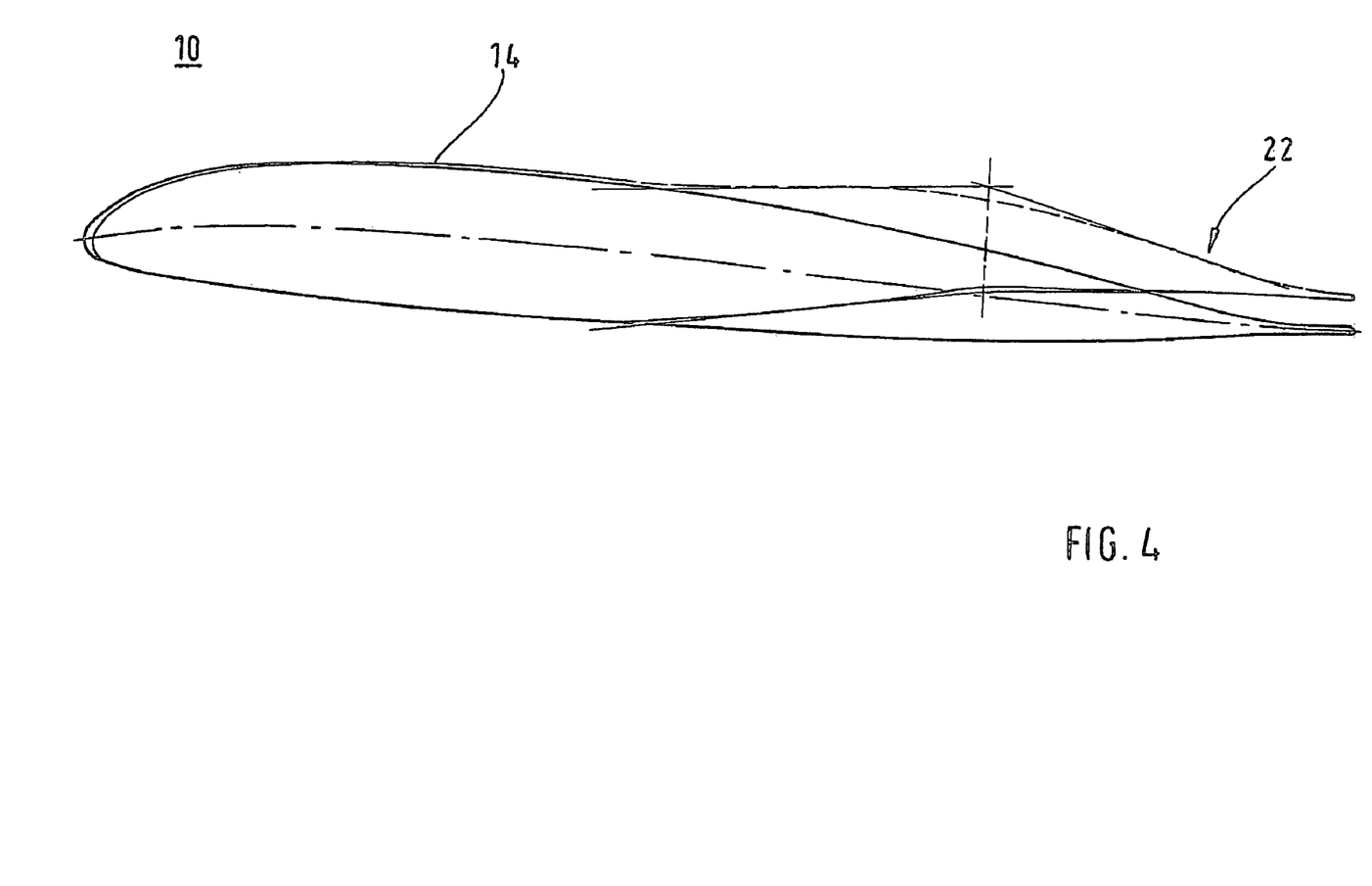
FIG. 4 shows the profile of FIG. 2 with the flap region deflected downward.

FIG. 4 once again shows the situation with a downwardly deflected rear profile deformation region 22. What occurs here, in accordance with the statements made above, is an upward flexural deformation of central profile region 24, which in turn results in a double curvature of upper and lower covering skins 16, 18 and causes the downwardly directed deflection of rear profile deformation region 22.

Further embodiments of the invention, in particular of the embodiment and arrangement of the actuators, are depicted in FIGS. 5 to 11.

Figure 5:
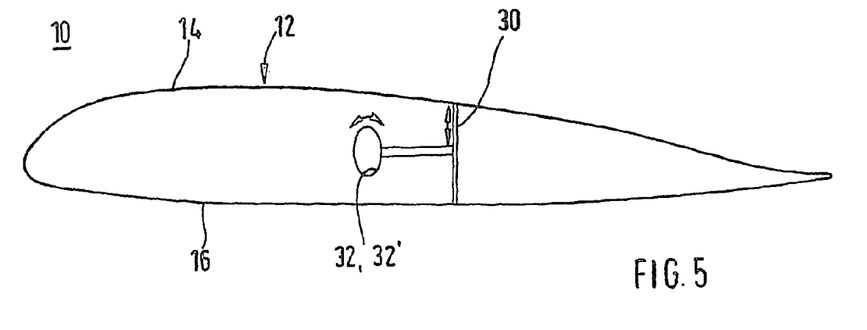
FIG. 5 shows the profile of FIG. 2 with a modified actuator embodiment or arrangement.

In the exemplifying embodiment depicted in FIG. 5, actuator or actuators 32, 32' is/are embodied as discrete actuators that, by torsion and by transfer of the torsional deformation to a strut 30, deform lower and upper covering skins 16, 18 and thus the central or rear profile region 24, 22.

Figure 6:
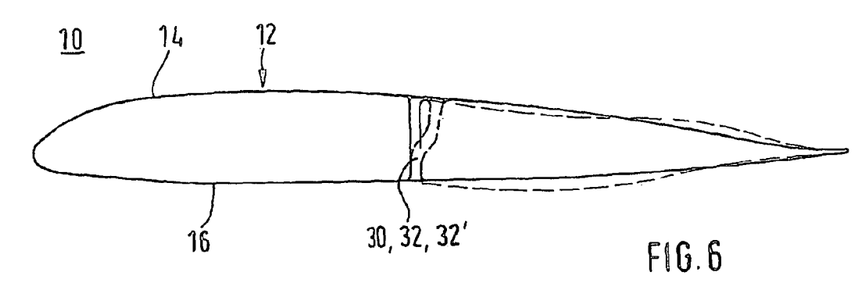
FIG. 6 shows the profile of FIG. with another modified actuator embodiment or arrangement.

According to the exemplifying embodiment shown in FIG. 6, the actuator is configured as a flexural actuator 32, 32' on at least one of struts 30. The strut is deformed by the flexural deformation of the strut.

Figure 7:
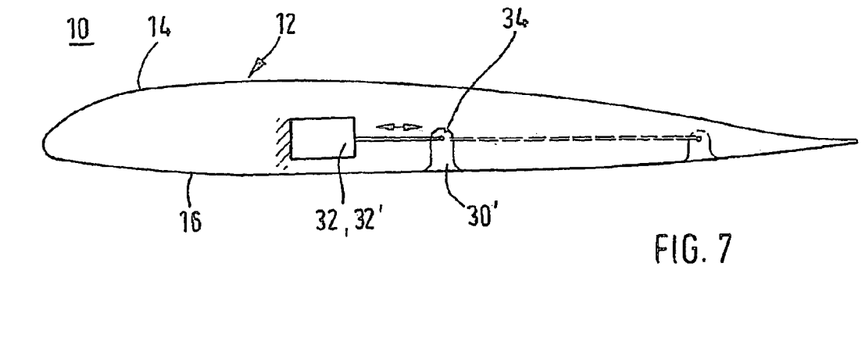
FIG. 7 shows the profile of FIG. 2 with another modified actuator embodiment or arrangement.

In the exemplifying embodiment according to FIG. 7, the actuator or actuators is/are embodied as discrete actuators 32, 32' that, by shortening an articulation point 34 on a strut segment 30', generate a moment on covering skins 16, 18 that brings about a deformation of the central or rear profile region 24, 22.

Figure 8:
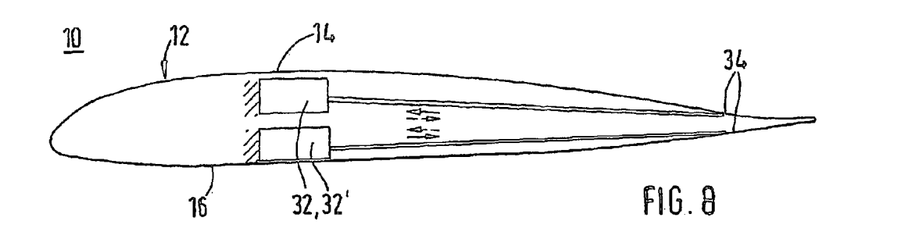
FIG. 8 shows the profile of FIG. 2 with another modified actuator embodiment or arrangement.

According to the exemplifying embodiment depicted in FIG. 8, the actuator or actuators 32, 32' is/are embodied as discrete actuators that, by shortening an articulation point 34 arranged on upper and/or lower covering skin 16, 18, bring about a deformation in rear profile deformation region 22.

Figure 9:
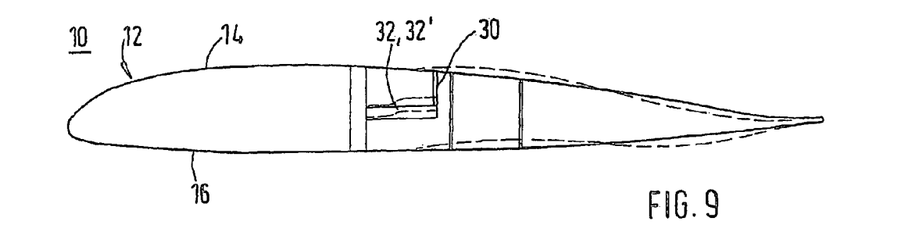
FIG. 9 shows the profile of FIG. 2 with another modified actuator embodiment or arrangement.

In the exemplifying embodiment depicted in FIG. 9, the actuator is embodied as a flexural actuator 32, 32' that is arranged perpendicular to a strut 30 and centeredly with regard to strut 30 in terms of the profile thickness. A flexural deformation of actuator 32, 32' causes, via strut 30, an introduction of force into upper and lower covering skin 16, 18 in order to deform the profile.

Figure 10:
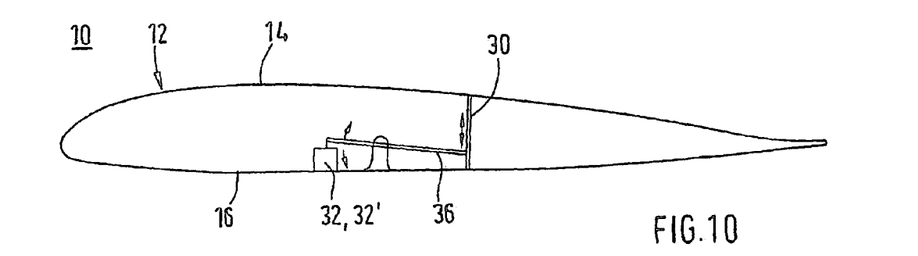
FIG. 10 shows the profile of FIG. 2 with another modified actuator embodiment or arrangement.

According to the exemplifying embodiment shown in FIG. 10, the actuator or actuators is/are embodied as discrete actuators 32, 32' that, by transferring force via a lever 36 to a strut 30, bring about a deformation of central profile region 24.

Figure 11:
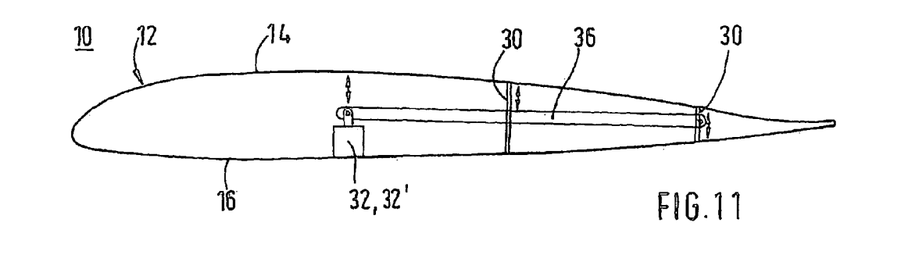
FIG. 11 shows the profile of FIG. 2 with another modified actuator embodiment or arrangement.

According to the exemplifying embodiment depicted in FIG. 1, the actuator or actuators is/are embodied as discrete actuators 32, 32' that, by transferring force via a lever 36 to a strut 30, bring about a deformation of central profile region 24 and of rear profile region 22 simultaneously.

What is claimed is:

1. An aerodynamic profile comprising:
   a main profile body defining a profile depth direction and being shear-flexible in the profile depth direction, the main profile body having a trailing edge region;
   a tension-stiff and compression-stiff upper covering skin;
   a tension-stiff and compression-stiff lower covering skin, the upper and lower covering skins defining the main profile body;
   a bearingless and hingeless rear profile deformation region disposed at the trailing edge region; and
   at least one actuator disposed in the main profile body configured to initiate a flexural motion of the main profile body with a flexural deformation of the upper and lower covering skins resulting in a curvature of the upper and lower covering skins so as to deform the rear profile deformation region and to yield a flap deflection directed opposite to a direction of the flexural motion of the main profile body for an S-shaped deformation of the profile.

2. The aerodynamic profile as recited in claim 1, wherein the main profile body defines a hollow chamber in an interior of the main profile body, the hollow chamber extending in a spanwise and a profile-depth direction.

3. The aerodynamic profile as recited in claim 2, further comprising a plurality of struts disposed in the hollow chamber and fixedly joined to the upper and the lower covering skin.

4. The aerodynamic profile as recited in claim 2, further comprising a shear-flexible material disposed in the hollow chamber.

5. The aerodynamic profile as recited in claim 3, wherein the struts are shear-flexible.

6. The aerodynamic profile as recited in claim 3, wherein the struts are flexurally soft.

7. The aerodynamic profile as recited in claim 3, wherein the struts are joined in flexurally soft or quasi-articulated fashion to at least one of the upper and lower covering skins.

8. The aerodynamic profile as recited in claim 1, further comprising a central profile region disposed adjacent to and in front of the rear profile deformation region in the profile depth direction of the main profile body, and wherein the central profile region and the rear profile deformation region are shear-flexible in the profile depth direction.

9. The aerodynamic profile as recited in claim 8, wherein the actuator is disposed in working engagement with the central profile region.

10. The aerodynamic profile as recited in claim 6, wherein the actuator is disposed in working engagement with the rear profile deformation region.

11. The aerodynamic profile as recited in claim 1, wherein the actuator is a flexural actuator.

12. The aerodynamic profile as recited in claim 11, wherein the flexural actuator is secured onto at least one of the upper and lower covering skin.

13. The aerodynamic profile as recited in claim 11, wherein the flexural actuator is secured onto a strut.

14. The aerodynamic profile as recited in claim 11, wherein the flexural actuator is disposed perpendicular to a strut with respect to a profile thickness and centered relative to the strut.

15. The aerodynamic profile as recited in claim 11, wherein the flexural actuator is joined to at least one of the upper covering skin, the lower covering skin and the strut.

16. The aerodynamic profile as recited in claim 1, wherein the actuator is a discrete actuator.

17. The aerodynamic profile as recited in claim 16, wherein the actuator is disposed in working engagement via an articulation point with a strut segment.

18. The aerodynamic profile as recited in claim 16, wherein the actuator is disposed in working engagement with an articulation point arranged on one of the upper and lower covering skins.

19. The aerodynamic profile as recited in claim 8, wherein the actuator is disposed in working engagement via a lever with a strut disposed in the central profile region.

20. The aerodynamic profile as recited in claim 8, wherein the actuator is disposed in working engagement via a lever with a strut disposed in the central profile region and in the rear profile region.

21. The aerodynamic profile as recited in claim 1, wherein the upper and the lower covering skins include a fiber composite material.

22. The aerodynamic profile as recited in claim 21, wherein at least one of the upper and lower covering skins has a thickness that varies in the profile depth direction.

23. The aerodynamic profile as recited in claim 1 wherein the S-shaped deformation of the profile comprises a first curvature and a second curvature.

24. A rotor for a rotorcraft, the rotor comprising:
   an aerodynamic main profile body defining a profile depth direction and being shear-flexible in the profile depth direction, the main profile body having a trailing edge region;
   a tension-stiff and compression-stiff upper covering skin;
   a tension-stiff and compression-stiff lower covering skin, the upper and lower covering skins defining the main profile body;

a bearingless and hingeless rear profile deformation region disposed at the trailing edge region; and at least one actuator disposed in the main profile body configured to initiate a flexural motion of the main profile body with a flexural deformation of the upper and lower covering skins resulting in a curvature of the upper and lower covering skins so as to deform the rear profile deformation region and to yield a flap deflection directed opposite to a direction of the flexural motion of the main profile body for an S-shaped deformation of the profile.

* * * * *